Nov. 6, 1934. E. C. CLIFFORD Re. 19,361

BARREL SUPPORTING AND COOLING DEVICE

Original Filed Nov. 14, 1933 2 Sheets-Sheet 1

INVENTOR
Edward C. Clifford
BY
Ramsey & Kent
his ATTORNEYS

Nov. 6, 1934. E. C. CLIFFORD Re. 19,361

BARREL SUPPORTING AND COOLING DEVICE

Original Filed Nov. 14, 1933 2 Sheets-Sheet 2

INVENTOR
Edward C. Clifford
BY
Ramsey & Kent
his ATTORNEYS

Reissued Nov. 6, 1934 Re. 19,361

UNITED STATES PATENT OFFICE 19,361

BARREL SUPPORTING AND COOLING DEVICE

Edward C. Clifford, Sand Lake, N. Y.

Original No. 1,957,199, dated May 1, 1934, Serial No. 697,914, November 14, 1933. Application for reissue July 23, 1934, Serial No. 736,561

25 Claims. (Cl. 225—1)

This invention relates to cooling devices and more particularly refers to improvements in cooling devices having a chamber or housing adapted to receive and to partially at least enclose a liquid or other container, such as a barrel, for instance, said housing having means therewithin for cooling the contents of the container positioned therein.

The primary object of the invention is to provide a cooling device for a container, such as a barrel, for instance, so constructed as to form with the outer surface of the container a cooling chamber, encircling the peripheral portion of said container, said chamber being provided with heat exchanging surfaces in close proximity to the said container surface, said heat exchanging surfaces forming part of a cooling medium circulating system.

Another object of the invention is to provide a cooling device for a container, such as a barrel, for instance, said device being preferably usable also as a support for the container, and being so constructed as to form with the outer surface of the container a cooling chamber, partially at least surrounding said container, said chamber being provided with means for circulating a cooling medium in close proximity to the said container surface, said means being so arranged as to insure a maximum cooling efficiency.

Still another object of the invention is to provide a support for a container, such as a barrel, for instance, said support having a housing adapted to hold the container in a position, making it possible to conveniently withdraw the contents thereof, said housing forming with the outer surface of the container, a chamber partially at least surrounding said container, provided with means for circulating a cooling medium in close proximity to the said container surface, said housing being so constructed as to permit ready insertion of the container therein or its removal therefrom.

A further object of the invention is to provide a support for a barrel, forming therewith a cooling chamber partially at least surrounding the periphery of said barrel, said chamber being equipped with means for circulating a cooling medium in close proximity to the part of the barrel enclosed thereby, said support being of such construction as to permit ready and direct withdrawal of the contents of said barrel in the usual manner; this avoiding the necessity of using pumps, or other circulating means entailing the employment of metallic pipes or receptacles for the discharge of liquid from the barrel, and thus precluding the possibility of the taste of the liquid withdrawn from the barrel being affected by contact with metallic surfaces.

A still further object is to provide a supporting and cooling device for barrels adapted to form with said barrel a cooling chamber partially at least enclosing the periphery thereof, said chamber being equipped with means for circulating a cooling medium in close proximity to the surface of said barrel, said support being of a simple and compact construction, and being preferably of a portable character so as to be adapted for domestic use in connection with beverages, such as beer, for instance, usually supplied in relatively small, easily handled kegs.

An additional object of the invention is to provide a support for a barrel of such construction as to hold the barrel in tilted position to aid in draining the contents therefrom, said support being provided with means for circulating a cooling medium in close proximity to the parts of the barrel enclosed by the support.

Still another object of the invention is to provide on the edges of the support contacting with the barrel, resilient members which, in conjunction with the barrel, serve to prevent access of outside air to the chamber containing the cooling medium circulating means.

An additional object of the invention is to provide a supporting housing for a barrel, adapted to form therewith a cooling chamber partially at least surrounding the peripheral surface of the barrel, said chamber being equipped with means for circulating a cooling medium in close proximity to parts of the barrel enclosed thereby, said support being made of two sections connected together in such fashion that they can be separated to permit introduction of a barrel and then moved to enclose the barrel.

In the embodiment of the invention shown in the enclosed drawings, the support for a barrel consists of two similarly shaped sections hinged together along one longitudinal edge to permit separation of the two sections. These sections have an external configuration closely resembling the external configuration of a barrel in that their peripheral surfaces are given the same curvature as the peripheral surface of a barrel, but their ends are cut away so that when the sections are closed with a barrel therewithin, the ends of the barrel will extend slightly through the ends of the sections. The sections may be made of any suitable material, such as wood, metal, etc., but preferably use is made of stain resisting metal for cleanliness and sanitation.

Within the bottom sections is permanently fixed a net-work made up of a plurality of interconnected conduits which serve as a passage for the circulation of cooling medium. In one form of the invention a plurality of interconnected conduits are hingedly secured to the lower section so that they can be moved pivotally independently of the top section. These upper conduits are connected to the lower conduits by means of flexible tubes so that the cooling medium can be passed from the lower conduits into the upper conduits and then back to the lower section to pass therefrom to the agent serving to force circulation. In another form of the invention the upper section has a plurality of interconnected conduits permanently affixed therein, so that when the upper section is moved pivotally the conduits move therewith. Again use is made of flexible tubular connections so that the cooling medium can be circulated, first through the conduits in one section, and then through the conduits in another section.

In order that entrance of outside air into the support when a barrel is positioned therein may be prevented, all edges of the supporting sections which contact with the barrel or with edges of the other section, are covered with a resilient gasket-like material which has good thermal insulating properties. In practice it has been found that sponge rubber serves admirably.

In the preferred form of the invention the conduits are spaced from the walls of the sections and liner sheets of configuration similar to the configuration of the section walls are spaced from the section walls so that insulating material can be placed between the section walls and the liners. These liners preferably are made of metal, but other material may be used advantageously. The lower section is provided with a drain outlet communicating with the liner therein, whereby it is possible to drain any condensed moisture from this section.

Other features, advantages, and objects of the invention will become apparent by reference to the following detailed description taken in conjunction with the accompanying drawings forming a part of the same, wherein.

Figures 1, 2, 3:
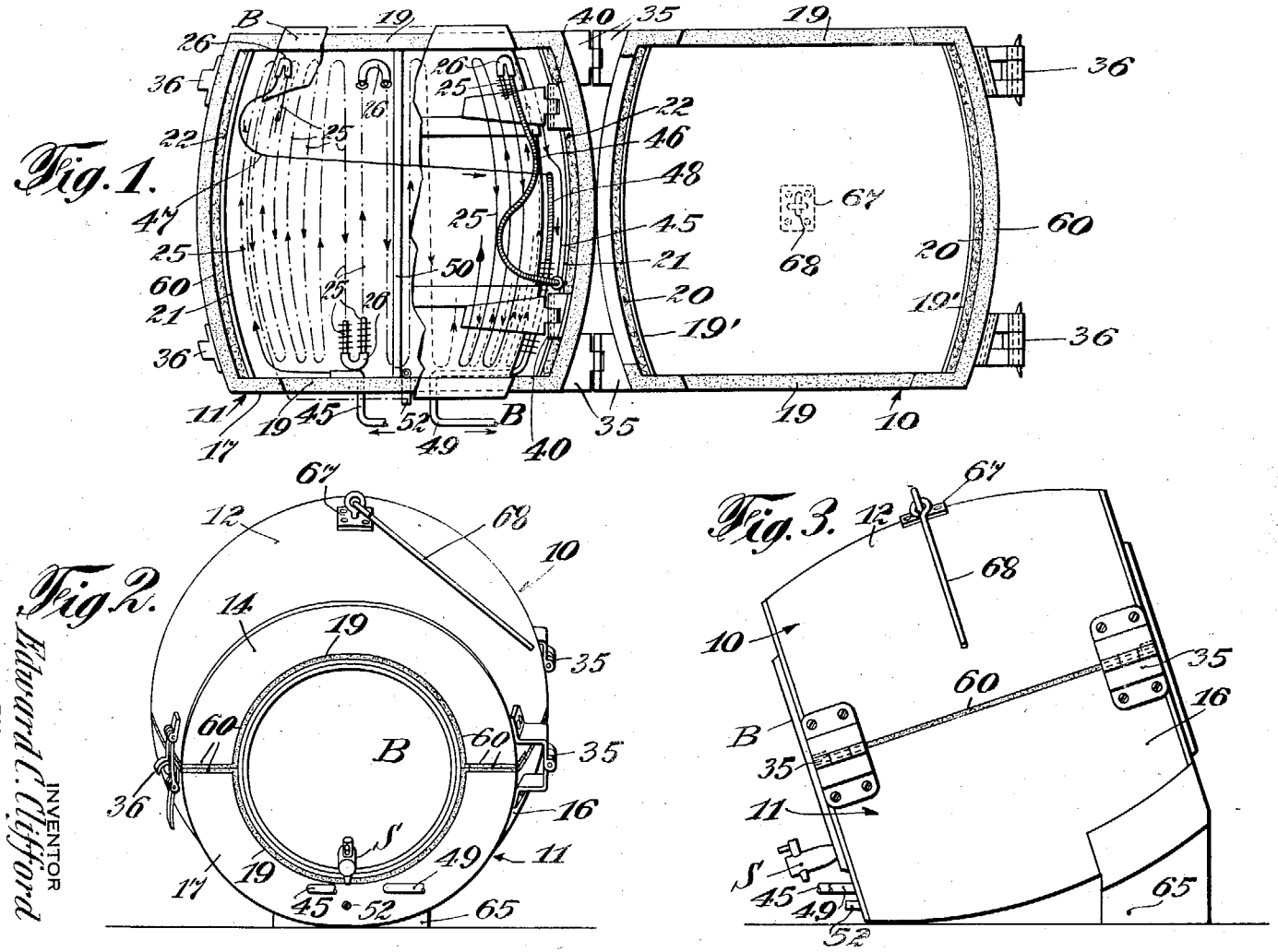
Fig. 1 is a plan view of a device embodying the invention with the top section separated from the lower section and with a network of conduits covering the top of a barrel in position over the barrel.
Fig. 2 is an end view of a device embodying the invention with a barrel enclosed therein.
Fig. 3 is a side view of the same device.

Referring now to the drawings, upper and lower sections of a supporting member are indicated at 10 and 11 respectively. The top section 10 is composed of a longitudinal wall 12 preferably of curvature conforming to the curvature of a barrel, such as for example, a beer barrel. To the ends of the wall 12 are secured end walls 14 and 15. The lower section 11 is provided with a longitudinal wall 16 similar in configuration to the wall 12 and with end walls 17 and 18. The end walls 14, 15, 17 and 18 have their inner edges of substantially semi-circular configuration as at 19 so that when the sections are closed as in Fig. 2, annular rings will be formed of pairs of end walls at the respective ends of the sections, with the walls 14 and 17 as one pair and the walls 15 and 18 as another pair. While the longitudinal walls and the end walls of the two sections have been shown in the drawings as being constructed of wood, it is to be understood that other materials of suitable nature can be used, and preferably these walls are to be made of some stain and acid resisting metal, such as for example, stainless steel. Hinges 35 are provided to connect adjacent longitudinal edges of the sections while clamps 36 serve to lock the sections together.

Spaced from the wall 12 is a liner 19′ of suitable material, such as metal, and of configuration similar to the configuration of the wall 12 and extending between the ends 14 and 15 to which it can be secured. By this arrangement of outer wall and liner, a space of uniform height is provided in which is placed insulating material 20 which may be any suitable material having good thermal insulating properties. The lower section 11 is provided with a liner 21 similar to the liner 19 and with a space in which is placed insulating material 22 similar to insulating material 20.

Positioned in the lower section 11 is a network of conduits 25 so interconnected by means of elbows 26 that a continuous passage is provided from one extreme conduit to the other for the circulation of suitable cooling medium. These conduits 25 extend immediately above the liner 21 in such fashion as to provide a network which conforms to the outline and the shape of the liner 21, and, of course, to the walls 16. The network of conduits can be permanently secured in lower section 11 in any desired fashion.

In the form of the invention shown in Fig. 1, use is made of a network of conduits 25 shaped in the same fashion as the network in the lower section, and due to the use of couplings 26 the network so formed will be more or less self-sustaining. As the result of this construction, it is possible to hinge the upper network to the lower section by means of hinges 40.

It will be noted in Fig. 1 that a barrel is shown in position in partially heavy lines and partially broken lines, while some of the pipes of the upper network are shown in heavy lines in position covering substantially the top half of the peripheral surface of the barrel. Since this upper network is hingedly connected to the lower section, it is possible to swing the network out of obstructing position so that a barrel can be placed in the lower section or removed therefrom.

All of the conduits 25 are provided with fins 44 in the nature of thin strips of metal extending around each conduit in spiral fashion along the length thereof. These fins aid in cooling articles supported within the two sections.

An inlet pipe 45 leads from suitable compressing and circulating mechanism, not shown, through the end wall 17 into communication with one extreme conduit in the network of conduits in the lower section 11. The other extreme conduit of this network is connected by means of a flexible tube 46 to one extreme conduit of the upper network. The other extreme conduit of this upper network is connected to a pipe 47 which leads back to the hinged side of the network and is connected to a flexible tube 48, which in turn is connected to an outlet pipe 49 passing through the end of the wall 17 and leading back to the compressing and circulating apparatus. Thus a complete circulation of cooling medium, first through the lower network and then through the upper network, can be accomplished.

To protect the conduits of the lower network, use is made of a bar 50 fastened to the end wall 18 and extending longitudinally of the lower section 11 to the other end wall 17 thereof, at which point it may be bent downwardly as at 51 to be embedded in the wall 16. If desired, however, it may be secured directly to the end wall 17 in the same fashion as it is secured to the end wall 18. This protecting bar is in a slightly higher position than the network of conduits, so that it will prevent contact between a barrel and these conduits.

Since condensed moisture will collect within the support, it is necessary to provide means for withdrawing the same, especially when the support is being defrosted. A drain 52 communicates with the lowest point of the liner 21 and extends outwardly through the end wall 17. A valve can be provided therefor, if desired.

Figure 5:
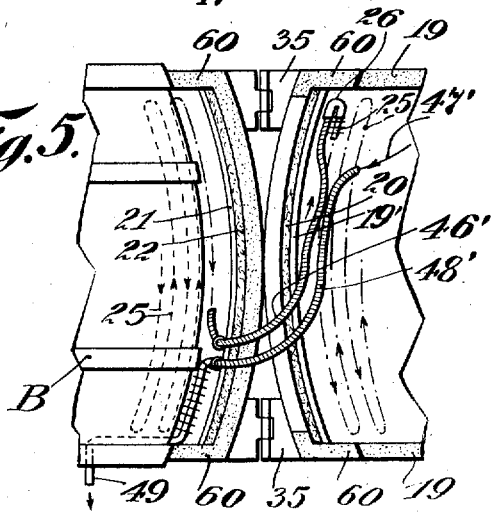
Fig. 5 is a partial view similar to Fig. 1 of a modification of the invention, wherein cooling coils are permanently affixed in the top section of the device.
Figure 6:
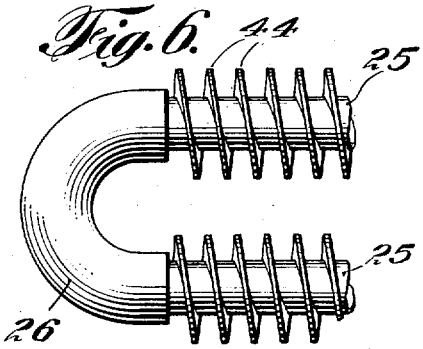
Fig. 6 is a detailed view of portions of conduits used for circulating cooling medium.

In the form of the invention shown in Fig. 5, the network in the lower section is arranged in the same fashion as in Fig. 1. However, the network for the top of the barrel to be chilled is not independently hingedly mounted but is permanently fastened within the upper section 10 in the same fashion as the lower network is fastened in the lower section 11. Again use is made of a flexible tube 46' for communication between an extreme conduit of the lower network and an extreme conduit of the upper network, and use is made of a return pipe 47' communicating with a flexible tube 48' which is connected to the outlet pipe.

Strips of good thermal insulating material 60 are secured to each edge of the walls of the sections which contact with other edges, or which contact with a barrel positioned in the support, to insure that there will be substantially no circulation of outside air into the chilled space when a barrel is in position to be cooled. The material 60 may be of any suitable character, such as for example, sponge rubber, so long as it possesses good thermal insulating properties.

A prop 65 is used for tilting one end of the support when the support is resting on a horizontal surface, so that a barrel will be tilted sufficiently to insure proper draining of the contents thereof. The top section 10 may be provided with an eye 67 to which is fastened either permanently or removably a rod 68 to serve as a prop for holding the upper section in partially open position if desired.

The operation and use of the device is substantially as follows: Assuming that it is resting on a horizontal surface, such as a counter, bar, etc., with the prop 65 in the position shown in Fig. 4, the device may be made ready for the reception of a barrel of suitable contents, such as, beer, by moving the upper section 10 about the axis of its hinges sufficiently to render access to the lower section. If the device is as shown in Fig. 5, the upper network of cooling conduits will be carried along with the top section, since this network is permanently secured thereto. However, if the network is arranged as shown in Fig. 1, it will be necessary to move this network pivotally about the axis of the hinges 40 an amount sufficient to render the lower section accessible.

Figure 4:
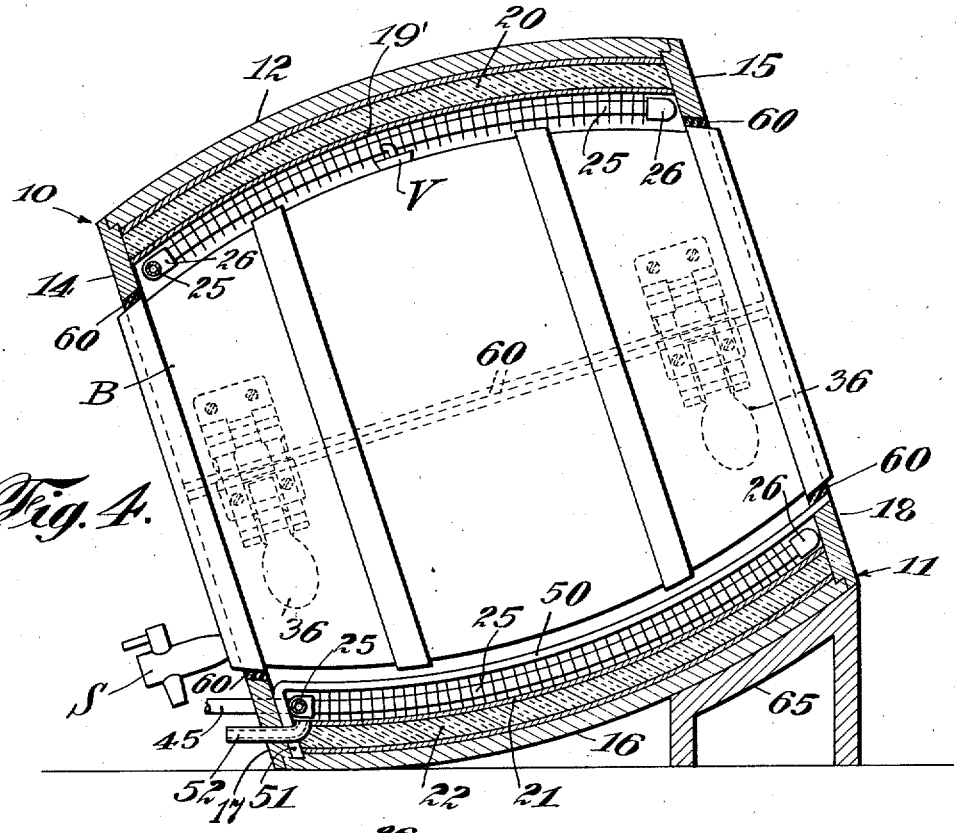
Fig. 4 is a vertical section of an embodiment of the invention with a barrel in position therein.

A barrel B is then positioned in the lower section in the fashion shown in Fig. 4 with the spigot S arranged to be at the lowermost possible point. The upper network may then be moved pivotally to overlie the barrel after which the upper section 10 is moved pivotally to complete the enclosing of the longitudinal expanse of the barrel. Of course, if the arrangement shown in Fig. 5 is used, the step of swinging the upper network is omitted. The two sections are then clamped together by means of clamps 36, after which the device is in condition to cool the contents of the barrel. The cooling medium enters through the inlet 45, passes through the lower network of conduits and into the upper network of conduits, after which it leaves the device through the outlet 49 to be returned to the compressing and circulating apparatus. The contents of the barrel can be withdrawn at any desired time through the spigot S and if necessary a vent V can be provided for the barrel. After the contents have been entirely withdrawn from the barrel, it can be removed from the device by reversing the steps previously stated, that is, by unlocking the clamps 36, swinging the cover about its axis, and if necessary, swinging the network of conduits about its axis.

The provision of a structure in which the longitudinal walls conform in shape to the longitudinal wall of a barrel and in which the conduits for circulating cooling medium have a corresponding curvature, makes it possible to cool the contents of the barrel with maximum efficiency.

The provision of the resilient strips of insulating material at all edges which contact with other edges or with the barrel, assure that the air space within the cooling device will be substantially dead air space when the barrel is positioned therein so that cooling is greatly facilitated. Of course, the device may be made in a number of different sizes, but inasmuch as barrels are of more or less standard sizes, it will be seen that no difficulty will be experienced in positioning any number of barrels of a specified size in a proper support. To compensate for any slight irregularities for barrel configuration, the protecting bar 50 is provided which assures that contact between the barrel surface and the conduits of the lower network will be prevented.

The invention is particularly advantageous for the dispensing of certain beverages, which whenever possible should be maintained at a low temperature and served directly from the barrel. For instance, beer should desirably be served "on tap" from the barrel, as when it is caused to flow through metallic pipes before being served it acquires a disagreeable metallic taste, which is highly objectionable.

On the other hand, it must be recognized that since beer barrels are usually made of rather heavy wood stock, a very energetic cooling action must be exerted in order to lower the temperature of the contents of the barrel to the desired point and in a relatively short time; so that a cooling action entailing the use of ice or so-called freezing mixtures would be entirely unsatisfactory from a practical standpoint; while the use of any wall or partition interposed between the cooling surfaces and the surface of the barrel would seriously impair the cooling efficiency of the apparatus.

From the foregoing it will be seen that the present invention provides a new, simple, novel and efficient device for cooling the contents of barrels, which device can be manufactured inexpensively and which will operate with a minimum of expense. It will be evident that modifications can be made without departing from the spirit of the invention, in view of which it is to be understood that the invention is not to be limited by the illustrated embodiments but is to be limited only by the scope of the following claims.

I claim:

1. A cooling device of the type described, comprising a housing adapted to receive and to surround a major part at least of the peripheral surface of a barrel, forming therewith a relatively narrow chamber, said housing comprising two separable sections extending longitudinally of the barrel at opposite sides thereof, and a network of conduits within said chamber adjacent to and directly facing the surface of the barrel enclosed by said housing, said conduits forming a passage for cooling medium, said network of conduits conforming to the transverse peripheral and longitudinal curvature of the barrel.

2. A cooling device of the type described, comprising a housing adapted to receive and to partially at least enclose a barrel, forming therewith a relatively narrow chamber, said housing comprising two separable sections extending longitudinally of the barrel at opposite sides thereof, and a network of conduits within said chamber adjacent to the surface of the container enclosed by said housing, said housing serving also as a support for the barrel, said network of conduits conforming to the transverse peripheral and longitudinal curvature of the barrel.

3. A cooling device of the type described, comprising two separable sections together forming a housing adapted to enclose partially at least a barrel having a spigot at one end thereof, forming with said barrel a relatively narrow chamber, said separable sections extending longitudinally of the barrel on opposite sides thereof and the end of said barrel provided with the spigot projecting beyond said housing whereby to expose and permit the operation of said spigot, and a network of conduits within said chamber adjacent to and directly facing the surface of the container enclosed by said housing, said conduits forming a passage for cooling medium.

4. A device of the type described comprising a support having a separable section forming with said support a housing adapted to receive and enclose partially at least a barrel having a spigot at one end, said housing forming with said barrel a relatively narrow chamber, said support and separable section extending longitudinally of said barrel, on opposite sides thereof, and the end of the barrel provided with the spigot projecting beyond the end of said housing whereby to expose and permit the operation of said spigot, and elements within said chamber forming a passage for a cooling medium within said housing, in proximity to the surface of said barrel enclosed thereby.

5. A cooling device of the type described, comprising a housing comprising separable sections adapted to receive and to surround a major part at least of the peripheral surface of a barrel having a spigot at one end thereof, forming with said barrel an air-tight relatively narrow chamber, said separable sections extending longitudinally of the barrel on opposite sides thereof and the end of said barrel provided with the spigot projecting beyond said housing whereby to expose and permit the operation of said spigot, and a network of conduits within said chamber adjacent to and directly facing the surface of the container enclosed by said housing, said conduits forming a passage for cooling medium, said network of conduits conforming to the transverse peripheral and longitudinal curvature of the barrel.

6. A device of the type described comprising a lower supporting section, an upper section connectable to said lower section and forming with it a housing adapted to support and enclose partially at least a barrel, said sections extending longitudinally of the barrel on opposite sides thereof and forming therewith a relatively narrow chamber, a network of conduits within said upper section adjacent to the surface of the barrel enclosed thereby and forming a passage for cooling medium, and flexible tubular means for inserting said network of conduits in the cooling medium circuit.

7. A device of the type described comprising a lower supporting section, an upper section connectable to said lower section and forming with it a housing adapted to support and enclose partially at least a barrel, said sections extending longitudinally of the barrel on opposite sides thereof and forming therewith a relatively narrow chamber, and a network of conduits within said lower section adjacent to the surface of the barrel supported thereby and forming a passage for cooling medium, said network of conduits conforming to the transverse peripheral and longitudinal curvature of the barrel.

8. A device of the type described comprising a lower supporting section, an upper section connectable to said lower section and forming with it a housing adapted to support and enclose partially at least a barrel, a network of conduits within said lower section adjacent to the surface of the barrel supported thereby and forming a passage for cooling medium, a network of conduits within said upper section adjacent to the surface of the barrel enclosed thereby and forming a passage for cooling medium, and flexible tubular means for inserting said last mentioned network of conduits in the cooling medium circuit.

9. A device of the type described comprising a lower supporting section, an upper section connectable to said lower section and forming with it a housing adapted to support and enclose partially at least a barrel, a network of conduits within said upper section adjacent to the surface of the barrel enclosed thereby and forming a passage for cooling medium, and flexible tubular means for inserting said network of conduits in the cooling medium circuit, said network being movably secured to said lower section for movement relative thereto independently of said upper section.

10. A device of the type described comprising a support for a container, said support enclosing partially at least a container and a network of conduits forming a passage for cooling medium, interposed between the surface of said container and said support, adjacent to and entirely surrounding the enclosed portion of said container, part of said network being movable to permit insertion of the container in and its removal from its operative position.

11. A device of the type described comprising a support for a barrel, such support having a configuration similar to that of a barrel and partially enclosing a barrel, and a network of conduits within the support adjacent to substantially the entire enclosed surface of the barrel and forming a continuous passage for cooling medium.

12. A device of the type described comprising a pair of similarly shaped sections hinged together to enclose partially a barrel, a network of conduits in each section adjacent the enclosed portions of the barrel, the conduits of each network being interconnected, and the networks being permanently connected to form a single continuous passage for cooling medium.

13. A supporting and cooling device of the type described comprising a lower section and an upper section, means for securing said sections together to enclose partially a barrel, a lower network of conduits forming a passage for cooling medium, an upper network of conduits forming a passage for cooling medium, said networks lying adjacent the surface of a barrel enclosed by said sections, and flexible connections between said networks to form the conduits thereof into a continuous passage.

14. A supporting and cooling device of the type described comprising a lower section and an upper section, means for securing said sections together to enclose partially a barrel, a lower network of conduits forming a passage for cooling medium, an upper network of conduits forming a passage for cooling medium, said networks lying adjacent the surface of a barrel enclosed by said sections, said upper network being movably secured to said lower section for movement relative thereto independently of said upper section.

15. A supporting and cooling device of the type described comprising a lower section and an upper section, means for securing said sections together to enclose partially a barrel, a lower network of conduits forming a passage for cooling medium, an upper network of conduits forming a passage for cooling medium, said networks lying adjacent the surface of a barrel enclosed by said sections, said upper network being permanently secured within said upper section.

16. A supporting and cooling device of the type described comprising a lower section and an upper section, means for securing said sections together to enclose partially a barrel, a lower network of conduits forming a passage for cooling medium, an upper network of conduits forming a passage for cooling medium, said networks lying adjacent the surface of a barrel enclosed by said sections, said upper network being movably secured to said lower section for movement relative thereto independently of said upper section, and connections between said networks to form the conduits thereof into a continuous passage.

17. A supporting and cooling device of the type described comprising a lower section and an upper section, means for securing said sections together to enclose partially a barrel, a lower network of conduits forming a passage for cooling medium, an upper network of conduits forming a passage for cooling medium, said networks lying adjacent the surface of a barrel enclosed by said sections, said upper network being permanently secured within said upper section, and connections between said networks to form the conduits thereof into a continuous passage.

18. A device of the type described comprising a lower section and an upper section hingedly secured together to enclose partially a barrel, said sections when closed having an external shape similar to that of a barrel, and lower and upper networks of conduits for the passage of cooling medium, said networks lying adjacent the enclosed barrel, the edges of each section making contact with the edges of the other section and with the barrel being provided with gaskets of resilient insulating material to form a substantially dead air space within the sections when the barrel is partially enclosed thereby, said networks being located in said dead air space.

19. A device of the character described comprising complementary enclosing sections, means for securing said sections together to enclose partially a barrel, said sections when secured together having an external shape similar to that of a barrel, and a network of conduits secured within each section to lie adjacent an enclosed barrel, and the network of one section being permanently connected to that of another section whereby a single continuous passage for cooling medium is formed.

20. A device of the character described comprising complementary enclosing sections, means for securing said sections together to enclose partially a barrel, said sections when secured together having an external shape similar to that of a barrel, and a network of conduits for each section forming a passage for cooling medium, the network for one section being hingedly secured to another section whereby it may be moved independently of its section.

21. A device of the character described comprising complementary enclosing sections, means for securing said sections together to enclose partially a barrel, said sections when secured together having an external shape similar to that of a barrel, a liner in each section, insulating material between the liner and the outer wall of the section, a network of conduits secured within each section to lie adjacent an enclosed barrel, said conduits being permanently interconnected to form a continuous passage for cooling medium, and a drain leading from the liner of the lowermost section.

22. A cooling device of the type described, comprising a housing adapted to receive and to surround a major part at least of the peripheral surface of a barrel, forming therewith a relatively narrow chamber, said housing comprising two separable sections extending longitudinally of the barrel at opposite sides thereof, a network of conduits within said chamber adjacent to and directly facing the surface of the barrel enclosed by said housing, said conduits forming a passage for cooling medium, said network of conduits conforming to the transverse peripheral and longitudinal curvature of the barrel, and means for draining condensed moisture from said chamber.

23. A device of the type described comprising a support having a separable section forming with said support a housing adapted to receive and enclose partially at least a barrel having a spigot at one end, said housing forming with said barrel a relatively narrow chamber, said support and separable section extending longitudinally of said barrel on opposite sides thereof and the end of the barrel provided with the spigot projecting beyond the end of said housing whereby to expose and permit the operation of said spigot, elements within said chamber forming a passage for a cooling medium within said housing, in proximity to the surface of said barrel enclosed thereby, and means for draining condensed moisture from said chamber.

24. A device of the type described comprising a support having a separable section forming with said support a housing adapted to receive and enclose partially at least a barrel having an attached spigot at one end, said separable section being displaceable to permit the barrel to be placed on said support and said support forming a trough adapted to receive and surround the lower peripheral portion of the barrel when placed in a substantially horizontal position, said trough having an end wall shaped to receive and support a segmental portion of the peripheral surface of the barrel in proximity to the end having the attached spigot and permitting the barrel to be lowered directly in place with its spigot projecting beyond said end wall, the inner surface of said trough forming a chamber with the peripheral surface of the barrel surrounded thereby, and a network of conduits forming a passage for cooling medium within said chamber adjacent peripheral surface of the barrel.

25. A device of the type described comprising a support having a separable section forming with said support a housing adapted to receive and enclose partially at least a barrel having an attached spigot at one end, said separable section being displaceable to permit the barrel to be placed on said support and said support forming a trough adapted to receive and surround the lower peripheral portion of the barrel when placed in a substantially horizontal position, said trough having an end wall shaped to receive and support a segmental portion of the peripheral surface of the barrel in proximity to the end having the attached spigot and permitting the barrel to be lowered directly in place with its spigot projecting beyond said end wall, the inner surface of said trough forming a chamber with the peripheral surface of the barrel surrounded thereby, a network of conduits forming a passage for cooling medium within said chamber adjacent peripheral surface of the barrel, and means for draining condensed moisture from said chamber.

EDWARD C. CLIFFORD.